3,287,450
CERTAIN MORPHOLINO-SUBSTITUTED 4-KETO-1,2,3,4-TETRAHYDROQUINOLINES
James W. Bolger, Canoga Park, Calif., assignor to Rexall Drug and Chemical Company, Los Angeles, Calif., a corporation of Delaware
No Drawing. Filed Aug. 19, 1964, Ser. No. 390,746
2 Claims. (Cl. 260—247.5)

This invention relates to compositions of matter classified in the art of chemistry as substituted tetrahydroquinolines.

The invention sought to be patented in its product composition aspect is described as residing in the concept of a 4-keto-1-lower alkyl-1,2,3,4-tetrahydroquinoline having a morpholinomethyl substituent at the 3-position, and to its hereinafter disclosed equivalents.

As used throughout the specification the terms "lower alkyl" and "lower alkoxy" embrace both straight and branched chain alkyl and alkoxy radicals respectively, containing from 1 to 6 carbon atoms.

The tangible embodiments of this invention possess the inherent general physical characteristics of being solid crystalline materials. Infra-red and ultra-violet spectral data and elemental analysis, taken together with the nature of the starting material and mode of synthesis, positively confirm the structure of the compounds sought to be patented.

The tangible embodiments of this invention possess the inherent applied use characteristics of having significant pharmacological activity as central nervous system depressant, antipyretic and anti-inflammatory agents as determined by recognized and accepted pharmacological test procedures.

The manner and process of making and using the invention will now be generally described so as to enable a person skilled in the art of chemistry to make and use the same as follows:

The starting materials for the preparation of the tangible embodiments of this invention, 4-keto-1-lower alkyl-1,2,3,4-tetrahydroquinolines and their hereinafter described equivalents are conveniently prepared as described in French Patent 806,715/1936 by heating an N-(2-cyanoethyl)-N-lower alkylaniline with a mixture of aluminum chloride, potassium chloride and sodium chloride, followed by hydrolysis.

The conversion of the starting material to the tangible embodiments of this invention is carried out by the following reaction sequence:

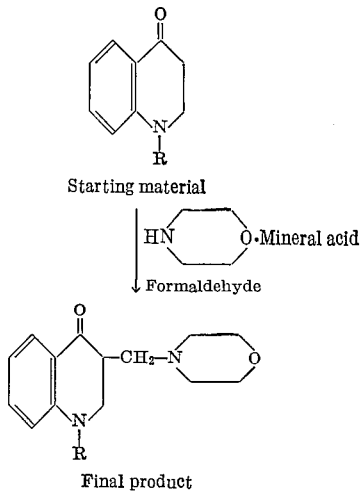

wherein R is lower alkyl.

According to the reaction sequence depicted above, the starting material is refluxed with a mineral acid salt of morpholine, for example morpholine hydrochloride, in an anhydrous inert solvent medium, for example a lower alkanol, such as ethanol, or tetrahydrofuran, in the presence of paraformaldehyde, or other source of formaldehyde, with a trace of mineral acid corresponding to that present in the salt of morpholine as catalyst. It has been found that refluxing in tetrahydrofuran constitutes a particularly effective method of carrying out the reaction in that maximum yields are obtained thereby. The product is recovered by conventional techniques of separation and crystallization as its salt with the acid present in the salt of morpholine used as reactant. The so-formed salt can be converted to the free base, if desired, by conventional basification techniques.

Starting materials wherein the benzene ring of the 4-keto-1,2,3,4-tetrahydroquinoline nucleus bears one or more lower alkyl, lower alkoxy, or halo substituents are prepared by the same techniques set forth in French Patent 806,715/1936 referred to hereinabove and are the full equivalents to the specific starting materials depicted hereinabove. Their use in the above described reaction sequence results in the preparation of final products having such alkyl, alkoxy or halo substitution on the benzene ring at the same place as in the starting materials, such products having the same utility as the specific products depicted in the above reaction sequence and are included within the scope of the tangible embodiments of the invention.

The tangible embodiments of this invention in free base form can, if desired, be converted into their non-toxic pharmaceutically acceptable acid-addition and quaternary ammonium salts. Salts which may be formed comprise, for example, salts with inorganic acids, such as the hydrochloride, hydrobromide, hydroiodide, sulfate, phosphate or the like. They may also comprise salts with organic acids, including monobasic acids such as the acetate or propionate, and especially those with hydroxy organic acids and dibasic acids, such as citrate, tartrate, malate, maleate and fumarate. Pharmaceutically, the salt will not be substantially more toxic than the compound itself and, to be acceptable, it should be able to be incorporated into conventional liquid or solid pharmaceutical media. Among the useful quaternary ammonium salts are those formed by such alkyl halides as methyl iodide, n-hexyl bromide and the like. Such pharmaceutically useful acid-addition and quaternary ammonium salts are the full equivalents of the bases from which they are derived and are included within the scope of this invention.

The tangible embodiments of this invention, either as free bases or in the form of a non-toxic pharmaceutically acceptable acid-addition or quaternary ammonium salt, can be combined with conventional pharmaceutical diluents and carriers to form such dosage forms as tablets, suspensions, solutions, suppositories and the like.

The best mode contemplated by the inventor for carrying out his invention will now be set forth as follows:

EXAMPLE

*4-keto-1-methyl-3-morpholinomethyl-1,2,3,4-tetrahydroquinoline hydrochloride*

4-keto-N-methyl-1,2,3,4-tetrahydroquinoline (10 g., 0.06 mole) and morpholine hydrochloride (7.66 g., 0.06 mole) are mixed together in dry tetrahydrofuran (100 ml.). A few drops of tetrahydrofuran containing hydrogen chloride gas are added as catalyst and the mixture is then set to reflux. Paraformaldehyde (3.5 g.) is slowly added to the refluxing mixture during the next two hours. The mixture is then decanted from a sticky amorphous mass formed during the reaction and cooled. A crude yellow solid forms upon cooling and is collected and recrystallized from methanol to yield 11 g. (61%) of product, M.P. 168–170° C.

*Analysis.*—Calculated for $C_{15}H_{21}N_2O_2Cl$: C, 60.70%; H, 7.13%; N, 9.44%; Cl, 11.95%. Found: C, 61.05%; H, 7.11%; N, 9.67%; Cl, 11.90%.

The subject matter which the applicant regards as his invention is particularly pointed out and distinctly claimed as follows.

I claim:

1. 4-keto-1-lower alkyl-3-morpholinomethyl-1,2,3,4-tetrahydroquinoline.

2. 4-keto-1-methyl-3-morpholinomethyl - 1,2,3,4-tetrahydroquinoline.

References Cited by the Examiner
FOREIGN PATENTS 944,854   6/1956   Germany.

OTHER REFERENCES

Fieser and Fieser: Organic Chemistry, Heath, 1958, p. 134.

ALEX MAZEL, *Primary Examiner.*

HENRY R. JILES, RICHARD J. GALLAGHER, *Assistant Examiners.*